US008726089B2

(12) United States Patent
Chen

(10) Patent No.: US 8,726,089 B2
(45) Date of Patent: May 13, 2014

(54) SYSTEM ERROR ANALYSIS METHOD AND THE DEVICE USING THE SAME

(75) Inventor: Chia-Hsiang Chen, Taipei (TW)

(73) Assignee: Inventec Corporation, Taipei (TW)

( * ) Notice: Subject to any disclaimer, the term of this patent is extended or adjusted under 35 U.S.C. 154(b) by 167 days.

(21) Appl. No.: 13/433,556

(22) Filed: Mar. 29, 2012

(65) Prior Publication Data

US 2013/0166957 A1      Jun. 27, 2013

(30) Foreign Application Priority Data

Dec. 21, 2011      (TW) ............................... 100147789 A

(51) Int. Cl.
*G06F 11/00*      (2006.01)

(52) U.S. Cl.
CPC .................................. *G06F 11/008* (2013.01)
USPC .................................. 714/37; 714/34; 714/25

(58) Field of Classification Search
CPC ....................................................... G06F 11/08
USPC ............................................. 714/34, 37, 4.1
See application file for complete search history.

(56) References Cited

U.S. PATENT DOCUMENTS 7,701,846 B2 *    4/2010    Chen et al. ..................... 370/216
2002/0133734 A1 *  9/2002    Sarathy et al. ..................... 714/4

* cited by examiner

*Primary Examiner* — Sarai Butler
(74) *Attorney, Agent, or Firm* — Morris Manning & Martin LLP; Tim Tingkang Xia, Esq.

(57) ABSTRACT

A system error analysis device which includes a top unit and a storage unit coupled to the top module is mentioned. The storage unit is configured to store each of the input data, each of the output data and each of the bus data transmitted by the top unit. When receiving an interrupting signal, the system error analysis device outputs the input data, the output data and the bus data stored as soon as the interrupting signal is received and the input data, the output data and the bus data stored before the receiving of the interrupting signal. Accordingly, by comparing and analyzing the data output by system error analysis device, the system employing the system error analysis device is able to obtain the reason of the generation of the interrupting signal.

8 Claims, 4 Drawing Sheets

SYSTEM ERROR ANALYSIS METHOD AND THE DEVICE USING THE SAME

CROSS-REFERENCE TO RELATED APPLICATIONS

This non-provisional application claims priority under 35 U.S.C. §119(a) on Patent Application No(s). 100147789 filed in Taiwan, R.O.C. on Dec. 21, 2011, the entire contents of which are hereby incorporated by reference.

BACKGROUND

1. Technical Field

The present disclosure relates to an analyzing method and the device using the same, more particularly to a system error analyzing method and the device using the same.

2. Related Art

Generally, a server system takes a programmable logic device as a controlling device which is used for controlling signals in the baseboard. The programmable logic device has a top unit and a plurality of function unit, wherein the function units are connected to the top unit. Here, by the top unit, the programmable logic device can receive input data from an external input device and transmit them to the function units. Then the programmable logic device outputs the output data received from the function unit and transmits them to the corresponding external input device, and transmits bus data from an external bidirectional bus device to the function units. Thus, the programmable logic device can control and process the signals outputted and received by the input device, the output device, and the bidirectional bus device in the server system.

Furthermore, the programmable logic device also has a memory space for storing the signals on the baseboard. In addition, the programmable logic device outputs the data stored in the memory space to inform the user or the administrator the state of the baseboard. However, because the memory space mentioned above merely could store the signals in the baseboard, once an error occurs during the operation of the server system or the power of the server system is interrupted, it is difficult for the server system to analyze the causation of the failure or the power interruption.

SUMMARY

In one aspect, some embodiments provide a system error analyzing method. The system error analysis method is used in a system error analysis device. The system error analysis device is capable of receiving an interrupting signal and includes a top unit. Thus, the system error analysis method comprises the following steps: N pieces of input data, M pieces of output data, and P pieces of bus data transmitted by the top unit are stored, wherein N, M and P are positive integers. Whether the positive integer N, M or P is larger than or equal to 2 is determined when the interrupting signal is received. An Nth piece of input data and an (N−1)th piece of input data are output, if N is larger than or equal to 2, wherein the Nth piece of input data is stored when the interrupting signal is received. An Mth piece of output data and an (M−1)th piece of output data are output, if M is larger than or equal to 2, wherein the Mth piece of output data is stored when the interrupting signal is received. A Pth piece of bus data and a (P−1)th piece of bus data are output, if P is larger than or equal to 2, wherein the Pth piece of bus data is stored when the interrupting signal is received.

In another aspect, some embodiments provide a system error analysis device. The system error analysis device is electrically coupled to at least one input device, at least one output device and at least one bidirectional bus device. The system error analysis device is capable of receiving an interrupting signal. The system error analysis device includes a top unit and a storage unit. The top unit is configured to receive N pieces of input data output from the at least one input device, output M pieces of output data to the at least one output device and transmit P pieces of bus data from at least one bidirectional bus device to the system error analysis device. Wherein N, M and P are positive integers. The storage unit is coupled to the top unit and is configured to store the N pieces of input data, the M pieces of output data and the P pieces of bus data. When the system error analysis device receives the interrupting signal, the system error analysis device respectively determines whether the positive integer N, M or P is larger than or equal to 2. If N is larger than or equal to 2, the storage unit outputs an Nth piece of input data and an (N−1)th piece of input data, wherein the Nth piece of input data is stored when the interrupting signal is received. If M is larger than or equal to 2, the storage unit outputs an Mth piece of output data and an (M−1)th piece of output data, wherein the Mth piece of output data is stored when the interrupting signal is received. If P is larger than or equal to 2, the storage unit outputs a Pth piece of bus data and a (P−1)th piece of bus data, wherein the Pth piece of bus data is stored when the interrupting signal is received.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

In the following embodiments, a system error analysis device 100 can be implemented by a complex programmable logic device (CPLD) used in a server system 200, but the disclosure is limited by the embodiments.

Figure 1A:
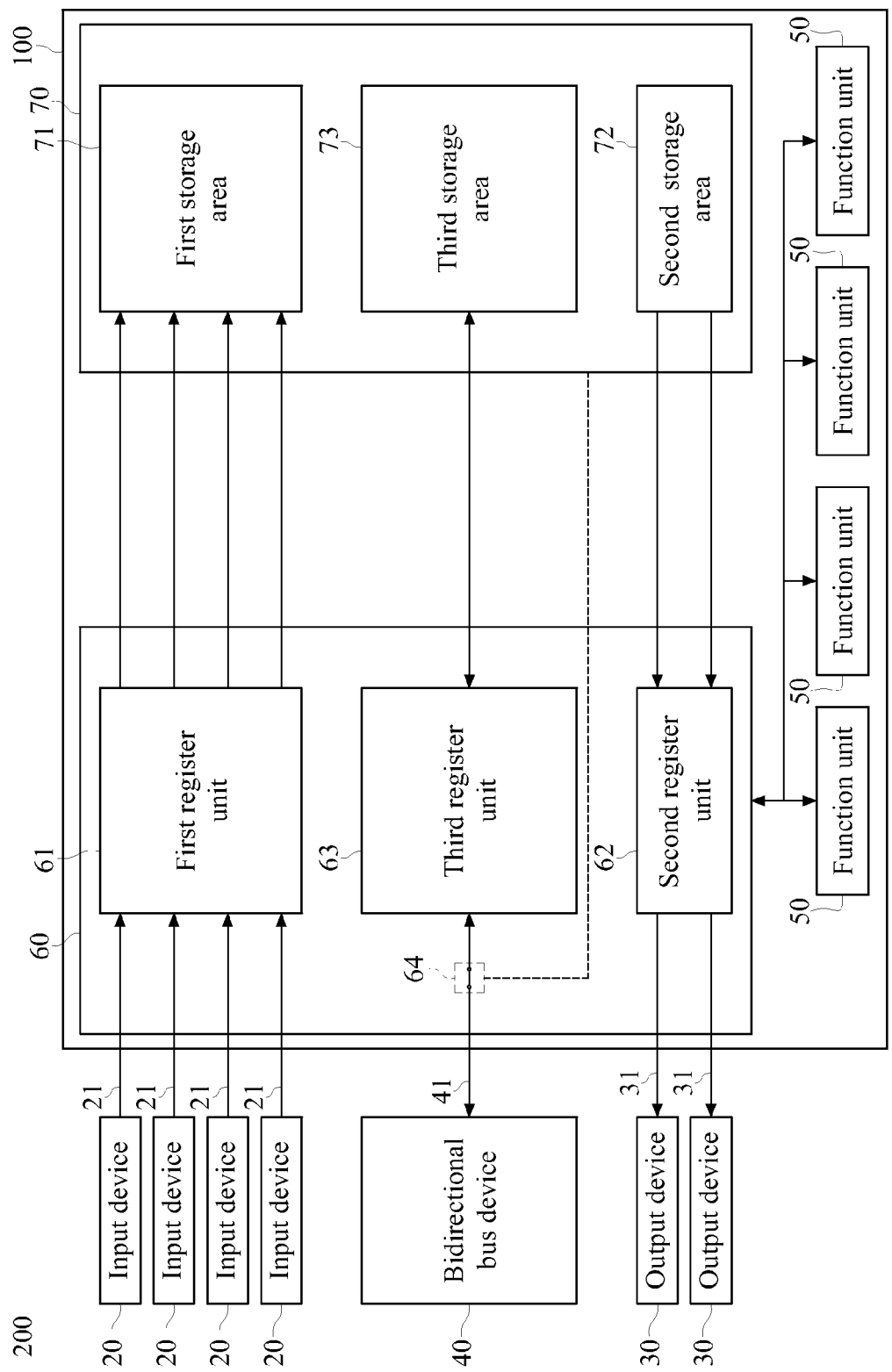
FIG. 1A is a block diagram of a structure of a system error analysis device 100 without interrupt signal received, according to one embodiment of the disclosure.
Figure 1B:
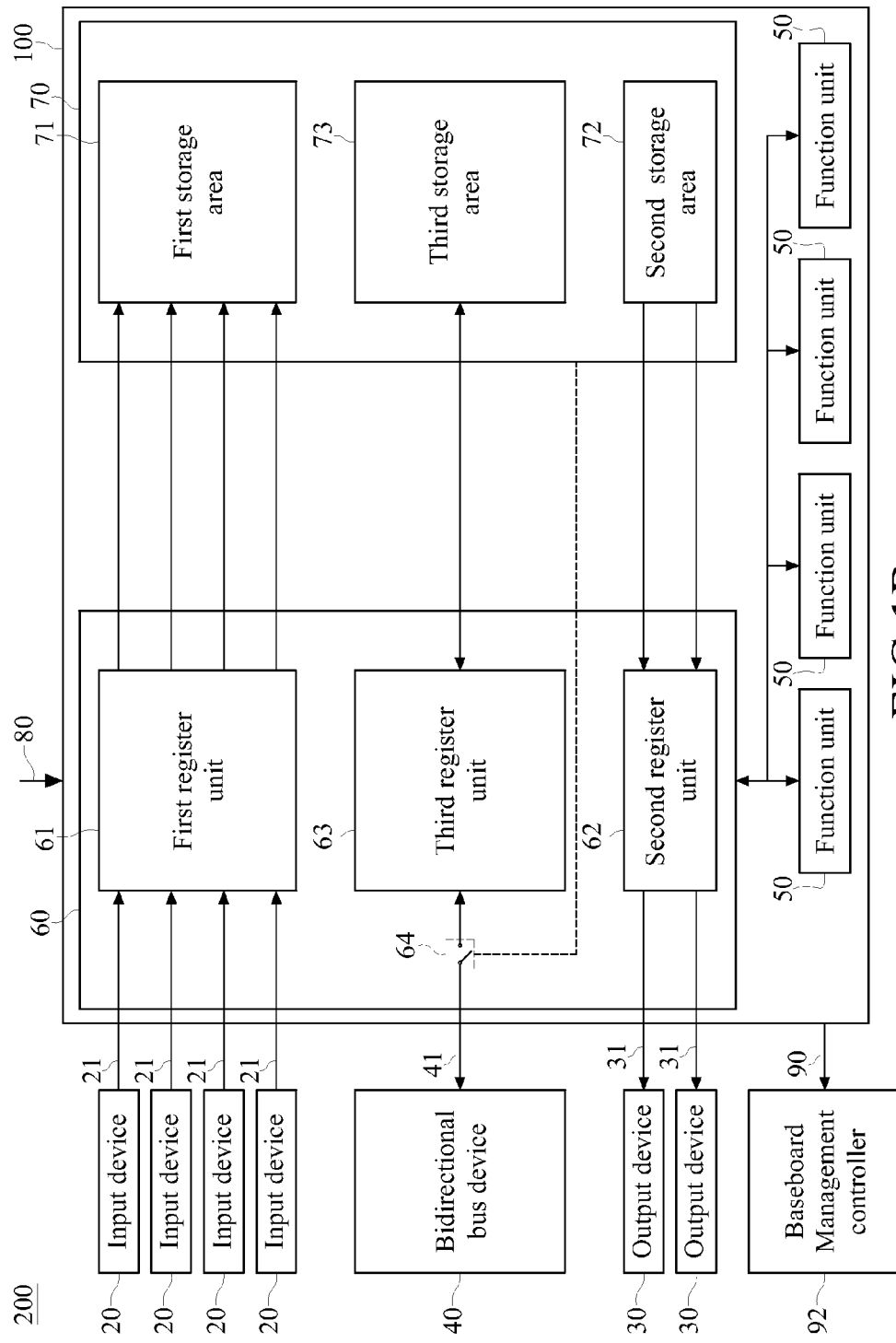
FIG. 1B is block diagram of a structure of a system error analysis device 100 with the interrupt signals received, according to the embodiment of the disclosure.

FIG. 1A is a block diagram of the system error analysis device 100 of an embodiment, wherein no interrupt signal is received. FIG. 1B is block diagram of the system error analysis device 100, wherein the interrupt signals are received. In this embodiment, the system error analysis device 100 is employed by a server system 200 and is suitable for connecting with four input devices 20, two output devices 30 and one bidirectional bus device 40. The four input devices 20 are, for example, GPI (General Purpose Input) devices, the two output devices 30 are, for example, GPOs (General Purpose Outputs) devices, and the bidirectional bus device 40 is, for example, LPC (Low Pin Count) device. Here, the numbers of the input device, the output device and the bidirectional bus device which are coupled with the actual system error analysis device 100 can be adjusted according to the actual demand.

Here, the system error analysis device 100 comprises four function units 50, a top unit 60 and a storage unit 70. Each of the function units and the storage unit 70 are coupled to the top unit 60, and the top unit 60 is coupled to the four input devices 20, the two input devices 300 and the bidirectional bus device 40. In this embodiment, four function units 50 are provided in the system error analysis device 100, but the disclosure is limited by the embodiment.

The top unit 60 is used to transmit N pieces of input data 21 output from the input devices 20 to the corresponding function unit 50, to output M pieces of output data 31 from the output device 30 to the corresponding function unit 50, and to transmit the P pieces of BUS data 41 from the bidirectional bus device 40 to the function unit 50, wherein N, M and P are positive integers. The storage unit 70 is used to store the N pieces of input data 21, the M pieces of output data 31 and the P pieces of BUS data 41, that is, the storage unit 70 is used to store all of the input data 21, the output data 31 and the BUS data 41 received or outputted by the system error analysis device 100.

Figure 2:
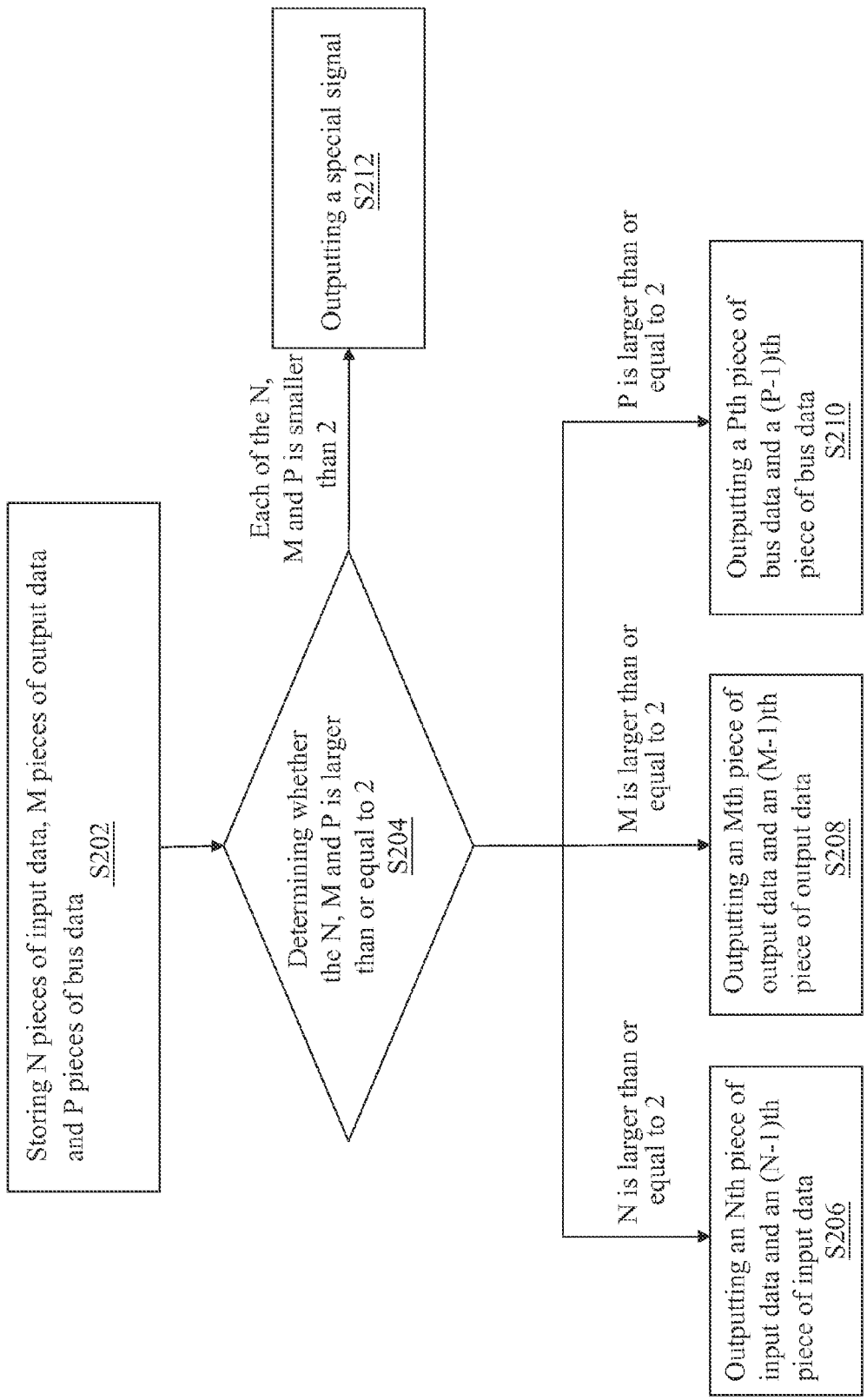
FIG. 2 is a flow chart of the system error analysis method implemented by the system error analysis device as shown in FIG. 1B according to the embodiment of the disclosure.

Referring FIGS. 1A, 1B and FIG. 2, FIG. 2 is a flow chart of the system error analysis method implemented by the system error analysis device as shown in FIG. 1B. The system error analysis method includes following steps. In the step S202, the N pieces of input data, the M pieces of output data and the P pieces of bus data transmitted by the top unit are stored, wherein all of N, M and P are positive integers. In the step S204, determining whether the positive integer N, M or P is larger than or equal to 2 when an interrupting signal is received. In the step S206, an Nth piece of input data and an (N-1)th piece of input data are output, if N is larger than or equal to 2. The Nth piece of input data is stored when the interrupting signal is received. In the step S208, an Mth piece of output data and an (M-1)th piece of output data are output, if M is larger than or equal to 2. The Mth piece of output data is stored when the interrupting signal is received. In the step S210, a Pth piece of bus data and a (P-1)th piece of bus data is output, if P is larger than or equal to 2. The Pth piece of bus data is stored when the interrupting signal is received.

When the system error analysis device 100 does not receive an interrupting signal 80, the system error analysis device 100 receives each of the input data 21, outputs each of the output data 31, and transmits each of the bus data 41. The interrupting signal 80 can be the error signal or the power failure signal, which is transmitted by a central processing unit (not shown) in the server system 200. When the top unit 60 inputs each of the N pieces of input data 21, outputs each of the M pieces of output data 31 and transmits each of the P pieces of bus data 41, the storage unit 70 reads and stores each of the input data 21 received by the top unit 60, each of the output data 31 output by the top unit 60 and each of the bus data 41 transmitted by the top unit 60 (i.e., S202).

The top unit 60 comprises a first register unit 61, a second register unit 62 and a third register unit 63. The first register unit 61 is used to temporarily store the input data 21 from each of the input devices 20, the second register unit 62 is used to temporarily store the output data 31 from each of the output devices 30, and the third register unit 63 is used to temporarily store the bus data 41 transmitted from the bidirectional bus device 40 to each of the function units 50. The data size of each of the input data 21 can be a one bit, the data size of the output data 31 can be a one bit, and the size of the bus data 41 can be, but is not limited to, 28 bits. When every bit in all of the bus data 41 is input to the third register unit 63 (that is, when the third register unit 63 has stored all of the bus data 41), the top unit 60 transmits each of the bus data 41 stored in the third register unit 63 to the bidirectional bus device 40 or the corresponding function unit 50. In another word, the bus data stored in the storage unit 70 is completed. For example, data size of each of the bus data received by the storage unit is also 28 bits.

Additionally, the top unit 60 further comprises a switching unit 64. The switching unit 64 is coupled to the bidirectional bus device 40 and the third register unit 63, when the system error analysis device 100 does not receive the interrupt signal 80. Thus, each of the bus data 41 can be transmitted from the bidirectional bus device 40 to the third register unit 63.

Figure 3:
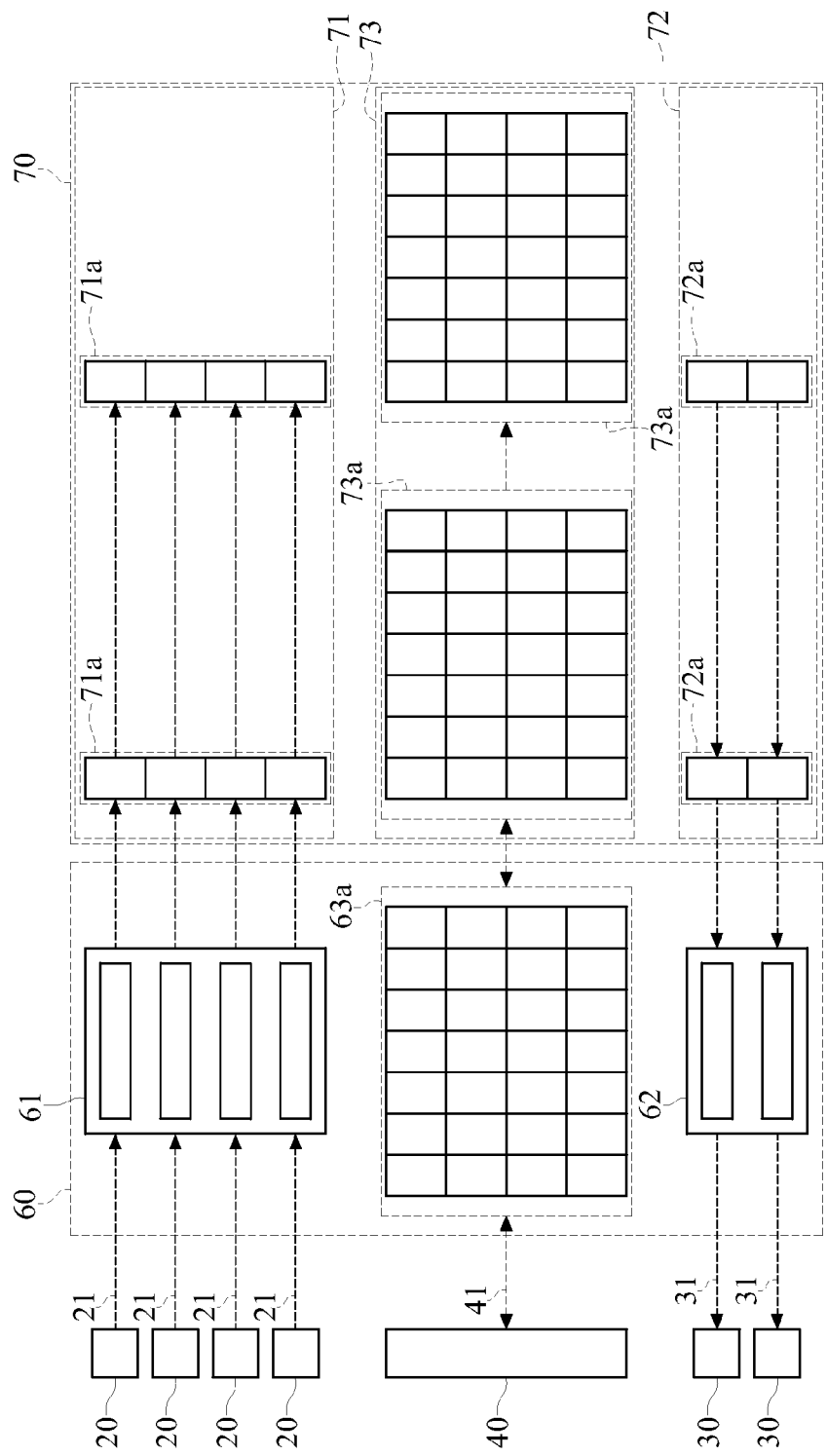
FIG. 3 is a schematic structural view of the input device, the output device, the bidirectional bus device, the top unit and the storage unit shown in FIG. 1A, according to an embodiment.

FIG. 3 is a schematic structural view of the input device, the output device, the bidirectional bus device, the top unit and the storage unit according to an embodiment as shown in FIG. 1A. In this embodiment, the storage unit 70 includes a first storage area 71, a second storage area 72, and a third storage area 73. The first storage area 71 is used to store each of the input data 21, the second storage area 72 is used to store each of the output data 31, and the third storage area 73 is used to store each of the bus data 41. The first storage area 71, the second storage area 72 and the third storage area 73 are serial-in storage areas.

More specifically, the first storage area 71 includes, but is not limited to, two first storage units 71a (i.e., each block in the first storage units 71a, as shown in FIG. 3) used to store the input data 21. The input data 21 stored in the first one of the first storage units 71a (i.e., the leftmost first storage unit 71a in FIG. 3) is the latest input data 21 stored in the first storage area 71, while the input data 21 stored in the last one of the first storage unit 71a (i.e., the rightmost first storage unit 71a in FIG. 3) is the earliest input data 21 stored in the first storage area 71. When the number of the input data received by the first storage area 71 is more than 2, the input data 21 stored in the first one of the first storage units 71a is deleted, and then the input data 21 stored in the another first storage unit 71a is shifted into the first one of the first storage areas 71a. In this embodiment, the number of the first storage units 71a can be two, the data size of each of the input data 21 transmitted by each of the input devices 20 can be, but is not limited to, one bit, and the data size of each data stored in each of the first storage unit 71a can be four bits. However, the embodiment is not intended to limit the disclosure.

The second storage area 72 includes, but is not limited to, two second storage units 72a (i.e., each block in the second storage units 72a, as shown in FIG. 3) used to store the output data 31 output to the output device 30. The output data 31 stored in the second one of second storage units 72a (i.e., the leftmost second storage unit 72a in FIG. 3) is the latest output data 31 stored in second storage area 72, while the output data 31 stored in the first one of the second storage units 72a (i.e., the rightmost second storage unit 72a in FIG. 3) is the earliest output data 31 stored in the second storage area 72. When the number of the output data received by the second storage area 72 is more than 2, the output data 31 stored in the first one of the second storage units 72a is deleted, and then the output data 31 stored in the second one of the second storage unit 72a is shifted into the first one of the second storage units 72a. In this embodiment, the number of the second storage units 72a can be two, each of the output data 31 transmitted by each of the input devices 20 can be but not limited to one bit, and the amount of data stored in each of the second storage unit 72a can be two bits. However, the embodiment does not be used to limit the disclosure.

At the same time, the third storage area 73 includes, but is not limited to, two third storage units 73a used to store the bus data 41. The bus data 41 stored in the second one of third storage unit 73a (i.e., the leftmost third storage unit 73a in FIG. 3) is the latest bus data 41 stored in the third storage area 73, while the bus data 41 stored in the first one of the third storage units 73a (i.e., the rightmost third storage unit 73a in FIG. 3) is the earliest bus data 41 stored in the third storage area 73. When the number of the bus data received by the third storage area 73 is larger than 2, the bus data 41 stored in the first one of the third storage units 73a is deleted, and then the bus data 41 stored in the second one of the third storage units 73a is shifted into the first one of the third storage units 73a. In this embodiment, the number of the third storage units 73a can be two, the data size of each of the bus data 41 transmitted by the bus device 40 or the function unit 50 can be, but is not limited to, 28 bits, and the data size of each data stored in each of the third storage unit 73a can be 28 bits. However, the embodiment is not intended to limit the disclosure.

Refer to FIGS. 1B and 2, when the system error analysis device 100 receives the interrupting signal 80, the bidirectional bus device 40 is coupled to the storage unit 70 by the switching unit 64. The system error analysis device 100 determines whether the N, M or P is larger than or equal to 2 when the interrupting signal is received (S204). If the system error analysis device 100 determines that N is larger than or equal to 2, then the Nth piece of input data 21 and the (N−1)th piece of input data 21 are outputted, wherein the Nth piece of input data 21 is stored in the system error analysis device 100 as soon as the interrupting signal 80 is received (S206). If the system error analysis device 100 determines that M is larger than or equal to 2, then the system error analysis device 100 outputs the Mth piece of output data 31 and the (M−1)th piece of output data 31, wherein the Mth piece of output data 31 is stored in the system error analysis device 100 as soon as the interrupting signal is received (S208). If the system error analysis device 100 determines that P is larger than or equal to 2, the Pth piece of bus data 41 stored in the system error analysis device 100 as soon as the interrupting signal is received (S210).

And then, the server system 200 receives and analyzes the data (i.e., the two input data 21, the two output data 31, and the two bus data 41) outputted by the system error analysis device 100 as the interrupting signal 80 is received for obtaining the reason of the interrupting signal 80. Here, the steps S206 to S210 mentioned above can be implemented respectively or synchronously, and the actual execution sequence of the steps S206 to S210 can be adjusted according to the actual demanded.

Additionally, the system error analysis method further comprises a step S212 of outputting a special signal, when the interrupting signal is received and every one of N, M and P is less than 2. For example, in a case where the interrupting signal 80 is received as soon as the server system 200 starts the system error analysis device 100, every one of the N, M and P is less than 2. In such case, the system error analysis device 100 transmits a special signal 90 to a baseboard management controller 92 for informing the server system 200 that the storage unit 70 cannot provide the complete data for correcting the fault, wherein, the special signal 90 has a special flag. For example, when the system error analysis device 100 sets the flag in the special signal 90 to 1, it indicates that the storage unit 70 cannot provide the complete data for correcting the fault. However, the value of the flag is not intended to limit the disclosure. In some embodiments, the system error analysis device 100 also could set the flag in the special signal 90 to 0 to indicate that the storage unit 70 cannot provide the complete data for correcting the fault.

According to the system error analysis method and the device thereof provided in the disclosure, since the storage unit stores each of the input data, each of the output data and each of bus data transmitted by the top unit, the system error analysis device can output two input data, two output data or two bus data (that is, the input data, the output data or the bus data received by the system error analysis device as soon as the interrupting signal is received, and the input data, the output data or the bus data stored in the system error analysis device before the interrupting signal is received), when an interrupting signal is received. By this way, the system provided with the system error analysis device could compare and analyze the data output from the system error analysis device, to obtain the reason of the interrupting signal. When the number of the input data, the number of the output data or the number of the bus data is less than two (for example, when the system just has been started) as soon as the system error analysis device received an interrupting signal, the system error analysis device outputs a special signal to inform that there is not enough for the correcting analyze.

What is claimed is:

1. A system error analysis method suitable for a system error analysis device, wherein the system error analysis device is capable of receiving an interrupting signal and including a top unit, the system error analysis method comprises:
   storing N pieces of input data, M pieces of output data and P pieces of bus data transmitted by the top unit, wherein, N, M and P are positive integers;
   determining whether the positive integer N, M or P is larger than or equal to 2 when the interrupting signal is received;
   outputting an Nth piece of input data and an (N−1)th piece of input data, if N is larger than or equal to 2, wherein the Nth piece of input data is stored when the interrupting signal is received;
   outputting an Mth piece of output data and an (M−1)th piece of output data, if M is larger than or equal to 2, wherein the Mth piece of output data is stored when the interrupting signal is received; and
   outputting a Pth piece of bus data and a (P−1)th piece of bus data, if P is larger than or equal to 2, wherein the Pth piece of bus data is stored when the interrupting signal is received.

2. The system error analysis method according to claim 1, further comprising:
   outputting a special signal, when the interrupting signal is received and each one of N, M, and P is less than 2.

3. A system error analysis device electrically coupled to at least one input device, at least one output device, and at least one bidirectional bus device, the system error analysis device is capable of receiving an interrupting signal, and the system error analysis device including:
   a top unit for receiving N pieces of input data from the at least one input device, outputting M pieces of output data to the at least one output device, and transmitting P pieces of bus data from at least one bidirectional bus device to the system error analysis device, wherein N, M and P are positive integers; and
   a storage unit coupled to the top unit, the storage unit being configured to store the N pieces of input data, the M pieces of output data and the P pieces of bus data,
   wherein when the system error analysis device receives the interrupting signal, then the system error analysis device respectively determines whether the positive integer N, M or P is larger than or equal to 2, if N is larger than or equal to 2, the storage unit outputs an Nth piece of input data and an (N−1)th piece of input data, wherein the Nth piece of input data is stored when the interrupting signal is received; if M is larger than or equal to 2, the storage unit outputs an Mth piece of output data and an (M−1)th piece of output data, wherein the Mth piece of output data is stored when the interrupting signal is received; and if P is larger than or equal to 2, the storage unit outputs a Pth piece of bus data and a (P−1)th pieces of bus data, wherein the Pth bus data is stored when the interrupting signal is received.

4. The system error analysis device according to claim 3, wherein when the system error analysis device receives the interrupting signal and determines that each one of N, M and P is less than 2, the system error analysis device outputs a special signal.

5. The system error analysis device according to claim 3, wherein the top unit comprises: a first register unit, a second register unit, and a third register unit, wherein the first register unit is configured to store one of the N pieces of input data, the second register unit is configured to store one of the M pieces of output data, and the third register unit is configured to store one of the P pieces of bus data.

6. The system error analysis device according to claim 5, wherein the top unit further comprises a switching unit coupled to the bidirectional bus device and the third register unit when the system error analysis device does not receive the interrupt signal, and the switching unit being coupled to the bidirectional bus device and the storage unit when the system error analysis device being has received the interrupting signal.

7. The system error analysis device according to claim 3, wherein the storage unit comprises a first storage area, a second storage area and a third storage area, the first storage area is configured to store the N pieces of input data, the second storage area is configured to store the M pieces of output data, and the third storage area is configured to store the P pieces of bus data.

8. The system error analysis device according to claim 7, wherein the first storage area, the second storage area and the third storage area are serial-in storage areas.

* * * * *